Oct. 29, 1968           H. SCHAEFER           3,407,990

HERMETICALLY SEALED REFRIGERATION COMPRESSOR

Filed April 11, 1967           2 Sheets-Sheet 1

Inventor:
Heinz Schaefer
BY Spencer & Kaye
Attorneys

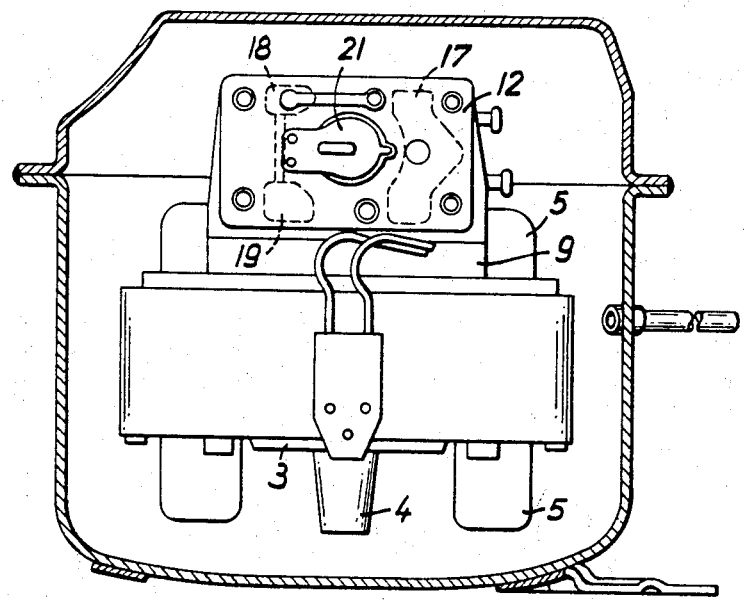

United States Patent Office 3,407,990
Patented Oct. 29, 1968

3,407,990
HERMETICALLY SEALED REFRIGERATION COMPRESSOR
Heinz Schaefer, Kassel, Germany, assignor to Licentia Patent - Verwaltungs - G.m.b.H., Frankfurt am Main, Germany
Filed Apr. 11, 1967, Ser. No. 629,943
Claims priority, application Germany, Apr. 16, 1966, L 53,359
6 Claims. (Cl. 230—58)

ABSTRACT OF THE DISCLOSURE

A hermetically sealed refrigeration compressor including an electrical motor which has two stator windings located on opposite sides of the stator, and arranged in such way, that the winding ends projecting beyond one axial end of the stator extend only partially over the circumference of the stator, forming gaps between themselves. A substantially flat bearing bracket, a compressor unit, and drive means for the compressor unit are all attached to the motor in the space between the axially extending ends of the stator windings.

Background of the invention

This invention relates to hermetically sealed refrigeration compressors, particularly to small compressors, such as used to operate home refrigerators or freezers.

In the development of such compressors, efforts have been made to decrease the size of the casing, to reduce the weight of the motor-compressor unit, and to simplify its construction and lower its cost. Attempts have been made, for example, to use rolled sheet metal parts instead of cast parts as much as possible, which has reduced the weight of the motor-compressor unit but which has not significantly reduced its size. To reduce the size of the motor-compressor unit, and thus to increase the available space within the refrigerator, several special arrangements of the structural parts have been proposed so that the casing of the motor-compressor can better conform to the outlines of its parts. The known casings in the shape of a spheroid or the flat, so-called pancake casings have resulted from these proposals. However, the possibilities for a further decrease in the casing volume are very strictly limited with encased motor-compressors having a vertical shaft and a piston compressor disposed beneath or above the motor, which are predominantly used today, as well as with motor-compressors having a horizontal shaft. An important impediment to the solution of this problem of reducing the space requirement of such compressors is to be found in the consistent use of single-phase induction motors with auxiliary starting windings for refrigeration compressors. The stator windings of these motor have stator coils the ends of which project above the end-faces of the stator core and extend over the entire stator circumference. This requires the use of a bearing bracket to mount and center the motor shaft in relation to the stator, which must enclose the coil ends, and is therefore of cup- or bell-shaped construction. Such a bearing bracket is a relatively large and heavy cast part which necessitates a rather large structural height, or for compressors with a horizontal shaft a correspondingly large structural length, since the compressor with its drive means must be mounted on the side of the bearing bracket which is away from the motor.

Summary of the invention

It is the object of this invention to provide a hermetically sealed small refrigerating compressor which, in comparison with the above-described compressors, is not only simpler in construction and lighter in weight, but which is also of smaller structural height or length, respectively. In accordance with this invention, these objectives are realized by utilizing a motor which has two stator windings arranged in such way that the ends of the stator windings projecting beyond one axial end of the stator extend only partially over the circumference of the stator, and form gaps between themselves. A substantially flat bearing bracket, a compressor unit, and drive means for the compressor unit are all located in the gaps, respectively, in the space enclosed by the axially extending ends of the stator windings. The use of such a motor provides a considerable reduction in the total size of the casing, since the bearing bracket is of small height, and since the compressor mounted thereon occupies a space which could not be used in the prior constructions, and this motor also provides a great savings of materials, since the casing for the unit can be considerably reduced in size and the bearing bracket can also be constructed considerably smaller and simpler, i.e., in a flat form. This results in a further advantage, namely, that such a flat bearing bracket, if it is formed by casting, is practically free of internal stresses.

The drive motor can be, for example, a two pole shaded-pole motor which, upon proper selection of its characteristics, can quite effectively meet the requirements of a compressor drive in spite of its known low efficiency. The shaded-pole motor has the further advantage that the starting relay and the condenser, and in some cases the overload protector as well, can be eliminated. These parts were formerly disposed in a special housing mounted on the outside of the motor-compressor casing, which housing increased the space requirement of the casing.

An asynchronous motor with an auxiliary phase winding can be used in place of the shaded-pole motor, if desired.

The flat bearing bracket provides a further simplification in mounting the compressor, since the bearing bracket, in combination with the cylinder block of the compressor, can be connected to the stator plates by the same two screws.

The invention is explained in detail below in connection with a hermetically sealed small refrigeration motor-compressor having a vertical motor shaft and a compressor disposed above the motor. The motor and compressor are resiliently mounted within the casing in the conventional manner, as indicated in the attached drawings.

Brief description of the drawings

FIGURE 3 is a side view of the embodiment shown in FIGURE 1 rotated by 90° as compared to the view shown in FIGURE 1, with the cylinder cover, valve plate, and valve seals removed therefrom.

Description of the preferred embodiment

Figure 1:
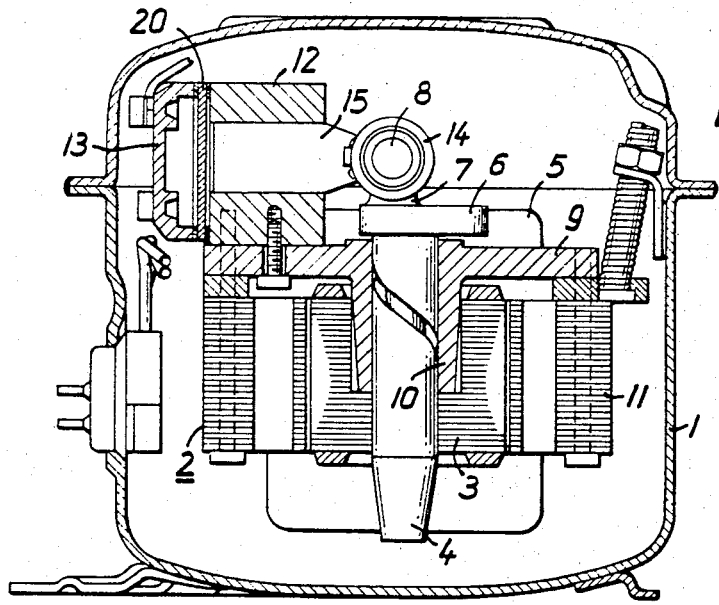
FIGURE 1 is a vertical cross-sectional view of one hermetically sealed motor-compressor unit of this invention.
Figure 2:
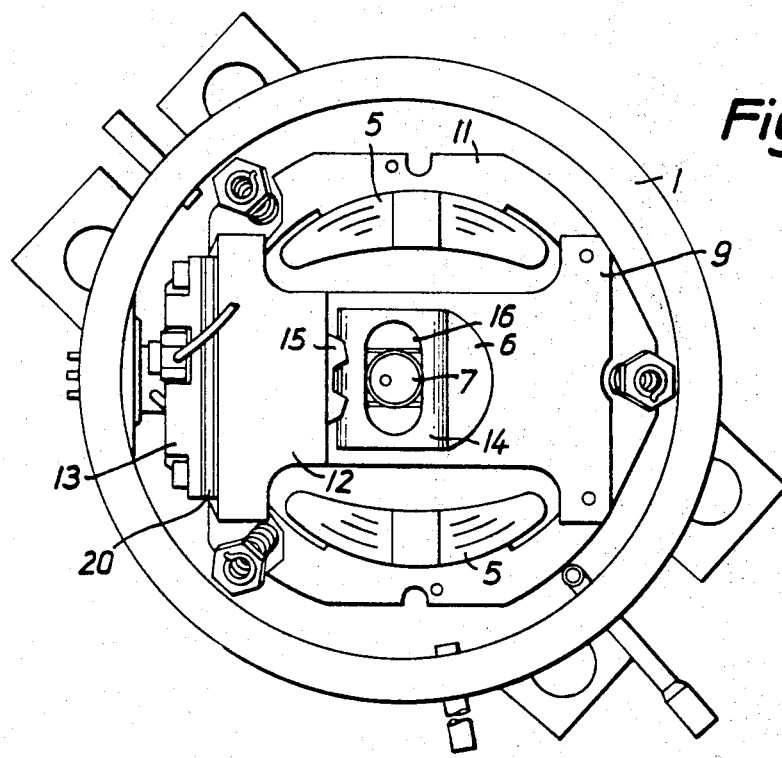
FIGURE 2 is a plan view of the embodiment shown in FIGURE 1 with the top of the casing thereof removed.

Referring to FIGURE 1, one embodiment of the invention comprises a motor-compressor unit which is hermetically sealed within a two-piece, welded, Freon-proof casing unit 1. The motor includes a stator 2, a rotor 3 and a shaft 4. Two stator windings 5 are disposed on opposite sides of the stator and extend, as can be seen in FIGURE 2, over only part of the circumference of the stator and also extend axially beyond the end of the stator with a space betwen the axial ends of the windings. The motor is a two pole motor with salient poles, and the upper end of the motor shaft 4 forms an eccentric crank 6 whose crankpin 7 cooperates with a crank guide 8 to drive a compressor piston 15 in the usual prior art manner. The rotor and stator of the motor are connected to a substantially flat bearing bracket 9, which contains a rotor bearing sleeve 10 in its center and which is rigidly attached to the stator core laminations 11 at both ends. Bearing bracket 9 is, as can be seen particularly well in FIGURE 2, a flat cast piece which is practically free of internal stresses, and it is fastened to the stator in the gaps between the axially extending ends of the stator windings 5. The bore for the shaft bearing is in the center of bearing bracket 9. As can be seen, bearing bracket 9 rests flat on the stator and the axial ends of coils 5 project over the sides of the bearing bracket. At one end of bearing bracket 9, the cylinder block 12 of the compressor is mounted on the stator along with the bearing bracket, by means of the same screws. Thus a very small number of tapped holes is required for mounting in this invention. The cylinder block 12 and its cover 13 are also disposed in the gap between the axially extending ends of the stator windings 5. Because of the flat configuration of bearing bracket 9, the eccentric 6 and crankpin 7 are disposed in the space enclosed by the axially extending ends of the stator windings 5, which space one could not take advantage of in the prior art constructions.

The crank guide in this embodiment of the invention comprises a prior art yoke 14 to which the piston 15 is connected, and a cross slide 16 which meshes with crankpin 7. Since this piston drive means corresponds to the prior art so-called "scotch yokes," however, its operation will not be described in detail.

As is shown in FIGURE 3, the cylinder block 12 is provided with several cavities 17, 18, 19, distributed around the cylinder bore, which serve as mufflers on the pressure and on the suction side of the compressor. These cavities open toward the frontal side of the cylinder block, and they are covered by a valve plate 20 and a seal as shown in FIGURE 1. In FIGURE 3, a suction valve wafer 21 is attached to the cylinder block 12.

The invention is not limited to the above-described embodiment, but can also be utilized, with equal success as regards the reduction of space requirements and savings in raw materials, in dual piston compressors with coaxially opposing cylinders. The invention can also be applied in compressors with a horizontal shaft. Here, too, the invention will provide a reduction in the structural length of the compressor.

It will be understood that the above description of the present invention is susceptible to various modifications, changes, and adaptations, and the same are intended to be comprehended within the meaning and range of equivalents of the appended claims.

I claim:
1. A hermetically encapsulated motor-compressor unit comprising, in combination:
   (a) an electrical motor having a rotor, a stator, and two stator windings located on opposite sides of said stator and projecting beyond one axial end of said stator, said axially projecting ends of said stator windings extending only partially over the circumference of the stator and forming gaps between themselves;
   (b) a substantially flat bearing bracket attached to said stator;
   (c) a compressor unit attached to said bearing bracket;
   (d) drive means coupled between said compressor unit and said rotor of said motor; and
   (e) said bearing bracket, compressor unit, and drive means all being located in the gap between the axially extending ends of said stator windings, respectively, in the space enclosed by them.

2. A motor-compressor unit as defined in claim 1 wherein said electrical motor is a shaded-pole motor.

3. A motor-compressor unit as defined in claim 1 wherein said electrical motor is an asynchronous motor having an auxiliary phase winding.

4. A motor-compressor unit as defined in claim 1 wherein said compressor unit includes a cylinder block and wherein said cylinder block and said bearing bracket are mounted on said stator by common mounting means.

5. A motor-compressor unit as defined in claim 4 wherein said cylinder block is dimensioned so as to fit into the space between the axially extending ends of said stator winding.

6. A motor-compressor unit as defined in claim 4 wherein said cylinder block contains a cylinder bore, and further comprising a plurality of cavities in one end of the cylinder block around said cylinder bore, a cylinder cover attached to said one end of said cylinder block, and sealing means between said cylinder cover and cylinder block for sealing said cavities.

References Cited

UNITED STATES PATENTS

| | | | |
|---|---|---|---|
| 1,951,230 | 3/1934 | Alexander | 310—172 XR |
| 2,669,095 | 2/1954 | Bishofberger | 310—172 XR |

ROBERT M. WALKER, *Primary Examiner.*